United States Patent
Sujan

(10) Patent No.: US 8,302,385 B2
(45) Date of Patent: Nov. 6, 2012

(54) APPARATUS, SYSTEM, AND METHOD FOR CONTROLLING ENGINE EXHAUST TEMPERATURE

(75) Inventor: Vivek A. Sujan, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 1145 days.

(21) Appl. No.: 12/130,694

(22) Filed: May 30, 2008

(65) Prior Publication Data

US 2009/0293453 A1    Dec. 3, 2009

(51) Int. Cl.
F01N 3/00    (2006.01)
F01N 3/10    (2006.01)
F01N 5/04    (2006.01)
F01N 3/02    (2006.01)

(52) U.S. Cl. ............... 60/295; 60/280; 60/285; 60/300; 60/311

(58) Field of Classification Search ............ 60/274, 60/280, 285, 286, 295, 300, 311
See application file for complete search history.

(56) References Cited

U.S. PATENT DOCUMENTS

| | | | |
|---|---|---|---|
| 5,398,502 A | 3/1995 | Watanabe | |
| 6,304,815 B1 | 10/2001 | Moraal et al. | |
| 6,382,177 B1 | 5/2002 | Saito | |
| 6,408,834 B1 | 6/2002 | Brackney et al. | |
| 6,519,933 B2 | 2/2003 | Ogiso et al. | |
| 6,594,990 B2 | 7/2003 | Kuenstler et al. | |
| 6,606,979 B2 | 8/2003 | Kimura | |
| 6,666,020 B2 | 12/2003 | Tonetti et al. | |
| 6,729,128 B2 | 5/2004 | Shiratani et al. | |
| 6,738,702 B2 | 5/2004 | Kolmanovsky et al. | |
| 6,826,905 B2 | 12/2004 | Gui et al. | |

(Continued)

FOREIGN PATENT DOCUMENTS

CN    1517525 A    8/2004

(Continued)

OTHER PUBLICATIONS

"How does Variable Turbine Geometry Work?", http://paultan.org/archives/2006/08/16/how-does-variable-turbine-geometry-work/ Mar. 27, 2008.

(Continued)

Primary Examiner — Thomas Denion
Assistant Examiner — Audrey K Bradley
(74) Attorney, Agent, or Firm — Kunzler Law Group, PC

(57) ABSTRACT

Various embodiments of an apparatus, system, and method are disclosed for controlling engine exhaust temperature. For example, according to one exemplary embodiment, an apparatus for controlling the temperature of engine output exhaust of an internal combustion engine during a regeneration event on a particulate matter filter includes a regeneration module and an exhaust temperature manager. The regeneration module is configured to determine a desired diesel oxidation catalyst (DOC) inlet exhaust temperature during a regeneration event. The exhaust temperature manager is configured to determine an air-to-fuel ratio strategy for achieving a desired air-to-fuel ratio within the combustion chamber for producing an engine output exhaust temperature approximately equal to the desired DOC inlet exhaust temperature. The air-to-fuel ratio strategy includes a first mode and a second mode. The first mode includes varying the position of an air intake throttle valve while maintaining a VGT device in a fixed position. The second mode includes varying the position of the VGT device while maintaining the air intake throttle valve in a fixed position.

18 Claims, 7 Drawing Sheets

U.S. PATENT DOCUMENTS

| | | |
|---|---|---|
| 6,829,890 B2 | 12/2004 | Gui et al. |
| 6,862,881 B1 | 3/2005 | Klingbeil et al. |
| 6,925,802 B2 | 8/2005 | Arnold |
| 6,925,976 B2 | 8/2005 | Israel et al. |
| 6,948,476 B2 | 9/2005 | Gioannini et al. |
| 6,951,100 B2 | 10/2005 | Kuboshima et al. |
| 6,952,918 B2 | 10/2005 | Imai et al. |
| 6,952,919 B2 | 10/2005 | Otake et al. |
| 6,959,541 B2 | 11/2005 | Kosaka et al. |
| 6,978,603 B2 | 12/2005 | Asanuma |
| 6,978,604 B2 | 12/2005 | Wang et al. |
| 6,988,361 B2 | 1/2006 | van Nieuwstadt et al. |
| 7,044,118 B2 | 5/2006 | Tonetti et al. |
| 7,086,220 B2 | 8/2006 | Imai et al. |
| 7,155,334 B1 | 12/2006 | Stewart et al. |
| 7,156,062 B2 | 1/2007 | Vanderpoel |
| 7,178,331 B2 | 2/2007 | Blakeman et al. |
| 7,246,595 B1 | 7/2007 | Hoare et al. |
| 7,313,913 B2 * | 1/2008 | Okugawa et al. ............... 60/295 |
| 7,343,735 B2 * | 3/2008 | Wang et al. ..................... 60/286 |
| 7,421,837 B2 | 9/2008 | Abe |
| 7,469,533 B2 | 12/2008 | Dawson et al. |
| 7,584,606 B2 * | 9/2009 | Colignon ........................ 60/295 |
| 7,657,364 B2 | 2/2010 | Guo |
| 7,762,060 B2 * | 7/2010 | Easley et al. .................... 60/285 |
| 2002/0078684 A1 * | 6/2002 | Carberry et al. ................ 60/295 |
| 2004/0055282 A1 | 3/2004 | Gray et al. |
| 2004/0244366 A1 | 12/2004 | Hiranuma et al. |
| 2005/0154519 A1 | 7/2005 | Kim |
| 2005/0223699 A1 | 10/2005 | Ancimer et al. |
| 2005/0235953 A1 | 10/2005 | Weber et al. |
| 2005/0241597 A1 | 11/2005 | Weber et al. |
| 2006/0242950 A1 | 11/2006 | Wang et al. |
| 2006/0283421 A1 | 12/2006 | Chiba et al. |
| 2007/0089400 A1 * | 4/2007 | Huang ............................ 60/284 |
| 2007/0214772 A1 | 9/2007 | England |
| 2008/0010975 A1 | 1/2008 | Zhang et al. |
| 2008/0078169 A1 | 4/2008 | Ishibashi |
| 2009/0198429 A1 | 8/2009 | Farrell et al. |
| 2009/0266060 A1 | 10/2009 | Guo et al. |

FOREIGN PATENT DOCUMENTS

| | | |
|---|---|---|
| EP | 1270884 A1 | 1/2003 |
| EP | 1344897 A1 | 9/2003 |
| EP | 1598526 A2 | 11/2005 |
| EP | 1662101 A1 | 5/2006 |
| EP | 1676991 A2 | 7/2006 |
| KR | 1020050070572 | 7/2005 |
| KR | 100589168 B1 | 6/2006 |

OTHER PUBLICATIONS

"Turbocharging", http://www.autozine.org/technical_school/engine/tech_engine_3.htm Mar. 27, 2008.

PCT/US2009/045847, International Search Report and Written Opinion, Jan. 18, 2010.

PCT/US2009/042121, International Search Results and Written Opinion, Dec. 1, 2009.

PCT/US2009/031015 International Search Report and Written Opinion, Aug. 13, 2009.

PCT/US2009/033423 International Search Report and Written Opinion, Jul. 28, 2009.

CN Application No. 200980113976.7 Office Action mailed Jul. 30, 2012.

* cited by examiner

APPARATUS, SYSTEM, AND METHOD FOR CONTROLLING ENGINE EXHAUST TEMPERATURE

FIELD

This disclosure relates to controlling regeneration events of a diesel particulate filter (DPF) of an internal combustion engine system, and more particularly to controlling engine exhaust temperature for a DPF regeneration event.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC). Catalytic converters implemented in an exhaust gas after-treatment system have been used to eliminate many of the pollutants present in exhaust gas. However, to remove diesel particulate matter, typically a diesel particulate filter (DPF) must be installed downstream from a catalytic converter, or in conjunction with a catalytic converter.

A common DPF comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially hazardous situations, accumulated particulate matter is commonly oxidized and removed in a controlled regeneration process before excessive levels have accumulated. To oxidize the accumulated particulate matter, exhaust temperatures generally must exceed the temperatures typically reached at the filter inlet. Consequently, additional methods to initiate regeneration of a diesel particulate filter may be used. In one method, a reactant, such as diesel fuel, is introduced into an exhaust after-treatment system to initiate oxidation of particulate buildup and to increase the temperature of the filter. A filter regeneration event occurs when substantial amounts of soot are consumed on the particulate filter.

A controlled regeneration can be initiated by the engine's control system when a predetermined amount of particulate has accumulated on the filter, when a predetermined time of engine operation has passed, or when the vehicle has driven a predetermined number of miles. Oxidation from oxygen ($O_2$) generally occurs on the filter at temperatures above about 400 degrees centigrade, while oxidation from nitric oxides ($NO_2$), sometimes referred to herein as noxidation, generally occurs at temperatures between about 250 C and 400 C. Controlled regeneration typically consists of driving the filter temperature up to $O_2$ oxidation temperature levels for a predetermined time period such that oxidation of soot accumulated on the filter takes place.

A controlled regeneration can become uncontrolled if the oxidation process drives the temperature of the filter upwards more than is anticipated or desired, sometimes to the point beyond which the filter substrate material can absorb the heat, resulting in melting or other damage to the filter. Less damaging uncontrolled or spontaneous regeneration of the filter can also take place at noxidation temperatures, i.e., when the filter temperature falls between about 250 C and 400 C. Such uncontrolled regeneration generally does not result in runaway temperatures, but can result in only partial regeneration of the soot on the filter. Partial regeneration can also occur when a controlled regeneration cannot continue because of a drop in temperature, exhaust gas flow rate, or the like. Partial regeneration and other factors can result in non-uniformity of soot distribution across the filter, resulting in soot load estimation inaccuracies and other problems.

The temperature of the particulate filter is dependent upon the temperature of the exhaust gas entering the particulate filter. Accordingly, the temperature of the exhaust must be carefully managed to ensure that a desired particulate filter inlet exhaust temperature is accurately and efficiently reached and maintained for a desired duration to achieve a controlled regeneration event that produces desired results.

Conventional systems use various strategies for managing the particulate filter inlet exhaust temperature. For example, some systems use a combination of air handling strategies, internal fuel dosing strategies, and external fuel dosing strategies.

The air handling strategies include managing an air intake throttle to regulate the air-to-fuel ratio. Lower air-to-fuel ratios, e.g., richer air/fuel mixtures, typically produce higher engine output exhaust temperatures.

Internal fuel dosing strategies include injecting additional fuel into the compression cylinders. Such in-cylinder injections include pre-injections or fuel injections occurring before a main fuel injection and post-injections or fuel injection occurring after a main fuel injection. Generally, post-injections include heat post-injections and non-heat post-injections. Heat post-injections are injections that participate along with the main fuel injection in the combustion event within the cylinder and occur relatively soon after the main fuel injection. Non-heat post injections are injections that occur later in the duty cycle compared to the heat post-injections and do not participate in the combustion event within the cylinder.

External fuel dosing strategies include injecting fuel into the exhaust gas stream at locations downstream of the engine. Typically, external fuel dosers are positioned in the exhaust aftertreatment system between the engine and a catalytic component, e.g., a diesel oxidation catalyst (DOC). The DOC reduces the number of pollutants in the exhaust gas through an oxidation process prior to the gas entering the particulate filter. The catalyst of the catalytic component must be at a specific temperature for oxidation of the pollutants to occur. The oxidation process heats the exhaust and causes the temperature of the exhaust to increase. In other words, during an oxidation process on the DOC, the DOC outlet exhaust temperature typically is greater than the DOC inlet exhaust temperature. Because fuel in the exhaust participates in the oxidation process, the exhaust temperature differential across the DOC, and thus the DOC outlet exhaust temperature, is largely dependent upon the amount of fuel in the exhaust gas entering the DOC.

Air handling strategies are aimed at controlling engine output exhaust temperatures. Internal fuel dosing strategies affect both engine output exhaust temperatures and DOC outlet exhaust temperatures. Fuel from internal fuel injections not combusted in the combustion event is oxidized in the DOC and increases the DOC outlet exhaust temperature. Similarly, external fuel injections simply add fuel to the exhaust stream, and thus increase the DOC outlet exhaust temperature.

In typical systems, the particulate filter 150 receives exhaust directly from the DOC. Accordingly, the particulate filter inlet exhaust temperature is approximately equal to the DOC outlet exhaust temperature. Therefore, an important tool in achieving a desired particulate filter inlet exhaust temperature is to ensure that the DOC is operating at the proper temperature for oxidation to occur. Because the temperature of the catalytic component is dependent upon the engine output exhaust temperature, many conventional engine systems employ various methods for controlling engine output exhaust temperature. However, such conventional methods can have several shortcomings. For example, for some mid-range engines operating under low load conditions and urban-type driving conditions (e.g., start-stop driving conditions with long periods of idle engine running), the engine output exhaust temperature control methods for such engines may be unable to achieve the engine output exhaust temperatures necessary to reach DOC activation temperatures. Moreover, when the engine is operating under low ambient air temperatures, it may be even more difficult for conventional engine output exhaust temperature control methods to attain adequately high engine output exhaust temperatures. When the DOC activation temperatures are not reached, the particulate filter may not adequately be able to regenerate, possibly resulting in the engine system outputting undesirable white smoke into the environment.

Based on the foregoing, a need exists for an engine controls strategy that achieves targeted engine output exhaust temperatures for achieving DOC activation temperatures and desired particulate filter inlet temperatures for regeneration events without the shortcomings of conventional engine output exhaust temperature control methods.

SUMMARY

The subject matter of the present application has been developed in response to the present state of the art, and in particular, in response to the problems and needs in the art that have not yet been fully solved by currently available engine controls strategies for achieving desired engine output exhaust temperatures corresponding to DOC activation temperatures. Accordingly, the subject matter of the present application has been developed to provide apparatus, systems, and methods for controlling the engine output exhaust gas temperatures to achieve desired DOC activation temperatures and associated particulate matter inlet exhaust temperatures. More specifically, in some implementations, apparatus, systems, and methods are described for achieving desired DOC activation temperatures for mid-range engines operating under urban-type driving conditions in low ambient air temperatures.

For example, according to one representative embodiment, an apparatus for controlling the temperature of engine output exhaust of an internal combustion engine during a regeneration event on a particulate matter filter includes a regeneration module and an exhaust temperature manager. The regeneration module is configured to determine a desired diesel oxidation catalyst (DOC) inlet exhaust temperature during a regeneration event. The exhaust temperature manager is configured to determine an air-to-fuel ratio strategy for achieving a desired air-to-fuel ratio within the combustion chamber for producing an engine output exhaust temperature approximately equal to the desired DOC inlet exhaust temperature. The air-to-fuel ratio strategy includes a first mode and a second mode. The first mode includes varying the position of an air intake throttle valve while maintaining a VGT device in a fixed position. The second mode includes varying the position of the VGT device while maintaining the air intake throttle valve in a fixed position.

In some implementations, the first and second mode of the air-to-fuel ratio strategy each includes manipulating the timing and dosage of a post-injection of fuel into the compression cylinder. The apparatus can also include a rate limiter module configured to modify the first and second modes according to the drivability of the engine. In certain implementations, the first mode is configured to vary an air intake flow rate and hold steady a mass charge flow rate and the second mode is configured to vary the mass charge flow rate and hold steady the air intake flow rate.

According to some implementations, the first and second modes are configured to increase the engine output exhaust temperature to achieve the desired engine output exhaust temperature. The first and second modes also can be configured to decrease the engine output exhaust temperature to achieve the desired engine output exhaust temperature.

In certain implementations, the first mode transitions to the second mode when the position of the air intake throttle valve reaches an intake throttle position lower limit. In yet certain implementations, the second mode transitions to the first mode when the position of the VGT device reaches a maximum open limit.

According to another embodiment, a method for controlling the temperature of engine exhaust entering a DOC upstream of a particulate matter filter includes determining a desired DOC inlet exhaust temperature. The method also includes modifying the air-to-fuel ratio in compression cylinders of the engine according to at least one of a first and second strategy to achieve a desired engine output exhaust temperature approximately equal to the DOC inlet exhaust temperature. The first strategy includes varying an air intake throttle position and holding steady a VGT device position. The second strategy includes varying the VGT device position and holding steady the air intake throttle position.

In some implementations, the method also includes determining a desired intake throttle position for increasing the engine output exhaust and modifying the air-to-fuel ratio according to the first strategy by moving the intake throttle into the desired intake throttle position. After moving the intake throttle into the desired intake throttle position, the method can further include modifying the air-to-fuel ratio according to the second strategy by opening the VGT device and maintaining the intake throttle in the desired intake throttle position. The desired intake throttle position can include an intake throttle position for achieving the desired engine output exhaust. Additionally, if the desired intake throttle position is greater than an intake throttle position lower limit of the engine, the method can include closing the intake throttle into the desired intake throttle position. Alternatively, if the desired intake throttle position is less than the intake throttle position lower limit, the method can further include closing the intake throttle into the intake throttle position lower limit and opening the VGT device while maintaining the intake throttle in the intake throttle position lower limit.

According to some implementations, the method includes modifying the air-to-fuel ratio to decrease the engine output exhaust temperature according to the second strategy by closing the VGT device. In other implementations, the method includes modifying the air-to-fuel ratio to decrease the engine output exhaust temperature according to the first strategy by opening the air intake throttle.

In yet some implementations, the method includes modifying the air-to-fuel ratio to decrease the engine out exhaust temperature. If a current position of the VGT device is equal to a maximum open limit of the VGT device, the method can include closing the VGT device according to the second strategy. If the current position of the VGT device is less than the maximum open limit of the VGT device, the method can include opening the air intake throttle according to the first strategy.

In certain implementations of the method, modifying the air-to-fuel ratio includes modifying the air-to-fuel ratio in the compression cylinders according to at least one of the first strategy, the second strategy, and a third strategy. The third strategy includes a fuel post-injection strategy that includes at least one post-injection of fuel. The third strategy can include at least one of retarding a timing of the at least one post-injection and increasing a dosage of the at least one post-injection event. Alternatively, the third strategy can include at least one of retarding a timing of the at least one post-injection and decreasing a dosage of the at least one post-injection event.

According to yet another embodiment, a method for controlling the temperature of engine exhaust entering a DOC upstream of a particulate matter filter during a regeneration event on the particulate matter filter includes determining a desired intake throttle position based at least partially on a speed and operating load of the engine. The method also includes determining a desired VGT device position based at least partially on the speed and operating load of the engine and determining a desired fuel post-injection strategy based at least partially on the speed and operating load of the engine. Additionally, the method includes actuating the intake throttle position according to the desired intake throttle position, actuating the VGT device position according to the desired VGT device position, and actuating a fuel injection system according to the desired fuel post-injection strategy to achieve a desired engine output temperature corresponding to a desired DOC inlet exhaust temperature.

In another embodiment, an internal combustion engine system includes an internal combustion engine generating an engine output exhaust, a fuel handling system for injecting fuel into the engine, a particulate matter filter in exhaust receiving communication with the internal combustion engine, and a DOC in exhaust receiving communication with the internal combustion engine and positioned between the internal combustion engine and the particulate matter filter. The controller includes a processor module configured to determine a desired DOC inlet exhaust temperature during a regeneration event and an air-to-fuel ratio strategy for achieving a desired air-to-fuel ratio in the engine for achieving a desired engine output exhaust temperature approximately equal to the desired DOC inlet exhaust temperature. The air-to-fuel ratio strategy includes at least one of a first, second, and third strategy. The first strategy includes varying the position of an air intake throttle valve while maintaining a VGT device in a fixed position. The second strategy includes varying the position of the VGT device while maintaining the air intake throttle valve in a fixed position. The third strategy includes modifying the timing and dosage of at least one post-injection of fuel by the fuel handling system.

In some implementations of the system, when the current DOC inlet exhaust temperature is less than the desired DOC inlet exhaust temperature, the first strategy is implemented in an attempt to increase the current DOC inlet exhaust temperature to the desired DOC inlet exhaust temperature. If the first strategy fails to increase the current DOC inlet exhaust temperature to the desired DOC inlet exhaust temperature, the second strategy is implemented in an attempt to increase the current DOC inlet exhaust temperature to the desired DOC inlet exhaust temperature. If the first and second strategies fail to increase the current DOC inlet exhaust temperature to the desired DOC inlet exhaust temperature, the third strategy is implemented in an attempt to increase the current DOC inlet exhaust temperature to the desired DOC inlet exhaust temperature.

In yet some implementations of the system, when the current DOC inlet exhaust temperature is more than the desired DOC inlet exhaust temperature, the second strategy is implemented in an attempt to decrease the current DOC inlet exhaust temperature to the desired DOC inlet exhaust temperature. If the second strategy fails to decrease the current DOC inlet exhaust temperature to the desired DOC inlet exhaust temperature, the first strategy is implemented in an attempt to decrease the current DOC inlet exhaust temperature to the desired DOC inlet exhaust temperature. If the first and second strategies fail to decrease the current DOC inlet exhaust temperature to the desired DOC inlet exhaust temperature, the third strategy is implemented in an attempt to decrease the current DOC inlet exhaust temperature to the desired DOC inlet exhaust temperature.

According to yet another implementation of the system, when the current DOC inlet exhaust temperature is more than the desired DOC inlet exhaust temperature, the first strategy is implemented in an attempt to decrease the current DOC inlet exhaust temperature to the desired DOC inlet exhaust temperature. If the first strategy fails to decrease the current DOC inlet exhaust temperature to the desired DOC inlet exhaust temperature, the second strategy is implemented in an attempt to decrease the current DOC inlet exhaust temperature to the desired DOC inlet exhaust temperature. If the first and second strategies fail to decrease the current DOC inlet exhaust temperature to the desired DOC inlet exhaust temperature, the third strategy is implemented in an attempt to decrease the current DOC inlet exhaust temperature to the desired DOC inlet exhaust temperature.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
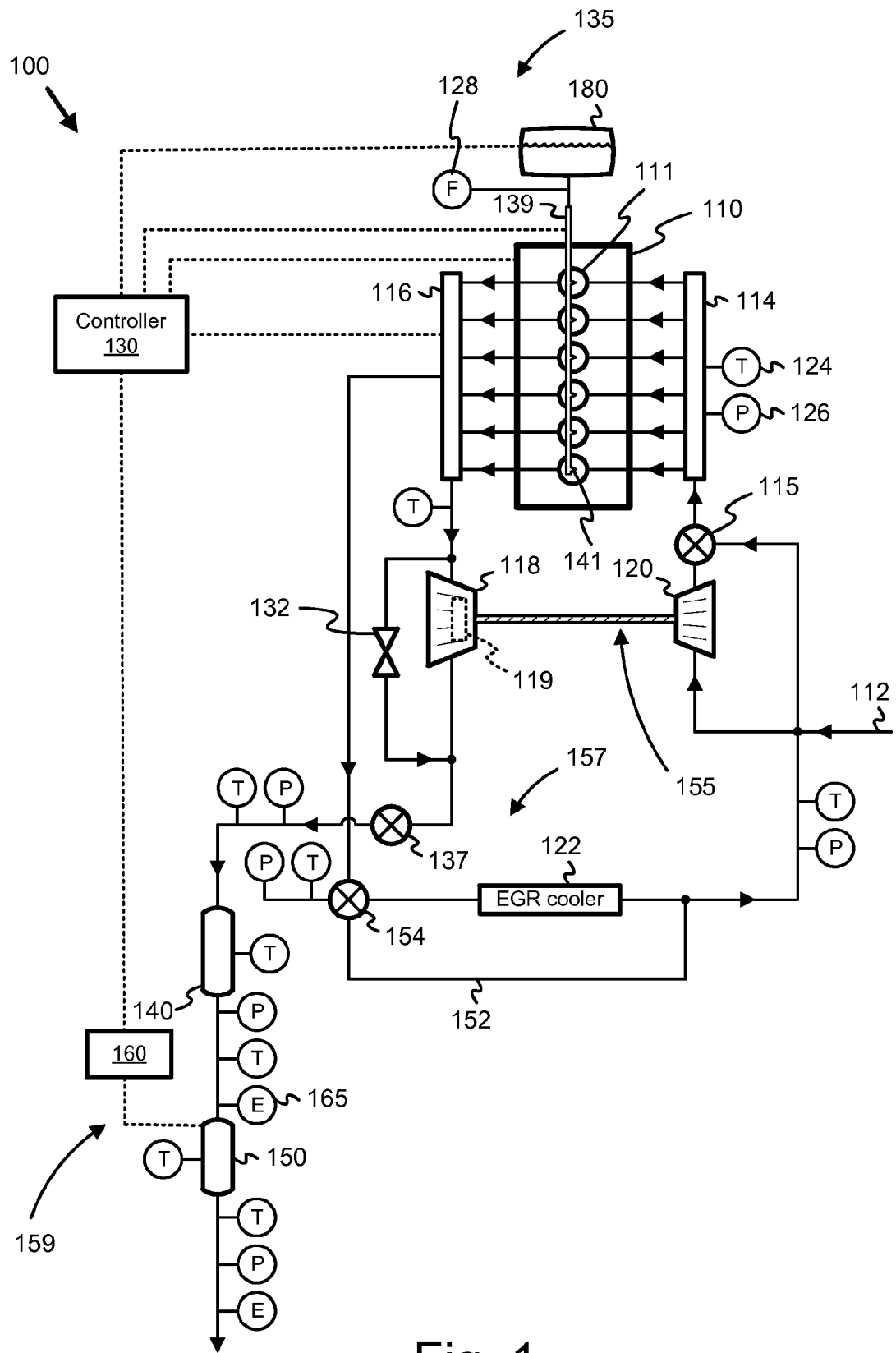
FIG. 1 is a schematic diagram of an engine system having a particulate filter according to one embodiment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

FIG. 1 depicts one exemplary embodiment of an internal combustion engine system, such as a diesel engine system 100, in accordance with the present invention. As illustrated, the engine system 100 includes a diesel engine 110, a controller 130, a fuel delivery system 135, a turbocharger system 155, an exhaust gas recirculation (EGR) system 157, and an exhaust gas aftertreatment system 159.

The engine 110 includes an air inlet 112, intake manifold 114, and exhaust manifold 116. The air inlet 112 is vented to the atmosphere, enabling air to enter the engine 110. The air inlet 112 is connected to an inlet of the intake manifold 114. The intake manifold 114 includes an outlet operatively coupled to combustion chambers 111 of the engine 110. The air from the atmosphere is combined with fuel to power, or otherwise, operate the engine 110. The fuel is delivered into the combustion chambers 111 by the fuel delivery system 135. The fuel delivery system 135 includes a fuel tank 180 for storing the fuel and a fuel pump (not shown) for delivering the fuel to a common rail 139. From the common rail, the fuel is injected into combustion chambers 111 through one of several fuel injectors 141. The timing and dosage of fuel into the combustion chambers 111 is controlled by the controller 130 via electronic communication lines (shown as dashed lines in FIG. 1). Combustion of the fuel produces exhaust gas that is operatively vented to the exhaust manifold 116.

The quantity of air entering the intake manifold 114 and thus the combustion chambers 111 is regulated by an intake throttle 115 operatively coupled to an accelerator pedal (not shown). The position of the intake throttle 115 and the quantity of air entering the intake manifold 114 corresponds at least partially to the amount of fuel entering the engine 110. The intake throttle 115 also is in electrical communication with the controller 130 and controllable by the controller. The controller 130 is operable to regulate the quantity of air entering the intake manifold 114 independent of the position of the accelerator pedal.

From the exhaust manifold 116, the exhaust gas flows into at least one of three systems, i.e., the turbocharger system 155, the EGR system 157, and the exhaust gas aftertreatment system 159. For example, based at least partially on the operating conditions of the engine, a portion of the exhaust gas can be directed into the turbocharger system 155, a portion of the exhaust gas can be directed into the EGR system 157, and a portion of the exhaust gas can be directed into the exhaust aftertreatment system 159. The relative portions of exhaust gas entering the respective systems 155, 157, 159 are controlled by the controller 130. Generally, the controller 130 determines the relative portions of exhaust gas that should enter the respective systems commands valves, e.g., turbine bypass valve 132, an EGR valve, and exhaust throttle valve 137, to allow a portion of the exhaust corresponding to the determined portions to enter the respective systems.

The turbocharger system 155 includes a turbocharger turbine 118, turbocharger compressor 120, and the turbocharger bypass valve 132. The turbocharger bypass valve 132 is selectively operable to regulate the flow of exhaust gas into the turbocharger turbine 118. The exhaust gas entering the turbine 118 causes the turbine to drive the compressor 120. When driven by the turbine 118, the compressor 120 compresses engine intake air before directing it to the intake manifold 114. Generally, the faster the rotational speed of the turbine 118, the more compressed the intake air. Accordingly, at high turbine speeds, the mass charge flow rate, i.e., the amount/mass of air per volumetric flow rate, is increased such that the amount of air entering the intake manifold 114 is increased even if the volumetric flow rate of air remains constant.

In certain implementations, the turbocharger turbine 118 is a variable geometry turbine (VGT) having a VGT device 119 such as is commonly known in the art. The VGT device 119 can be a series of movable vanes for controlling the flow of exhaust hitting the blades of the turbine. For example, in conventional applications, at low engine speeds, the exhaust velocity is insufficient to effectively spin the turbine. Accordingly, at low engine speeds, the vanes can be moved into a relatively closed position such that the spaces between the vanes are relatively small. As the exhaust passes through the small spaces, it accelerates and is redirected to contact the turbine blades at a specific angle for optimum or fully-enhanced rotation of the blades. In other words, when in the closed position, the vanes accelerate and redirect exhaust to increase the turbine's speed and compression of the air. In contrast, at high engine speeds, the exhaust velocity is sufficient to effectively spin the turbine. Accordingly, at high engine speeds, the vanes can be moved into a relatively open position such that the spaces between the vanes are relatively large. As the exhaust passes through the large spaces, its velocity remains relatively constant and experiences minimal redirection such that the blades of the turbine experience a less enhanced rotation. The positions of the vanes are adjusted via an actuator in electrical communication with the controller 130 such that the controller 130 can control the positions of the vanes.

The EGR system 157 includes an EGR cooler 122, an EGR valve (not shown) in the exhaust manifold, and an EGR cooler bypass valve 154. The EGR valve is selectively controlled by the controller 130 to regulate the flow of exhaust entering the EGR system 157 from the exhaust manifold, and thus indirectly regulating the flow of exhaust entering the aftertreatment system 159. When the EGR valve is at least partially open, at least a portion of the engine exhaust enters the EGR system 157 and is recirculated into the combustion chambers 111 of the engine 110 to be combusted with air from the air intake 112. Prior to entering the combustion chambers 111, the EGR exhaust gas can be passed through the EGR cooler 122 to cool the exhaust gas in order to facilitate increased engine air inlet density. The EGR cooler bypass valve 154 is operatively controlled by the controller 130 to regulate the amount of EGR exhaust passing through the EGR cooler 122 and the amount of EGR exhaust gas bypassing the EGR cooler 122 via an EGR bypass line 152.

In addition to the VGT device 119 and the EGR valve, the flow rate of exhaust entering the exhaust aftertreatment system 159 can be regulated by an exhaust throttle 137 positioned within the exhaust stream between the catalytic component 140 and the turbocharger system 155. Like the VGT device 119, the exhaust throttle 137 is actuatable between a closed position and an open position. The closed position corresponds with a minimum space through which exhaust gas can pass and the open position corresponds with a maximum space through which exhaust gas can pass. As the space through which the exhaust flows is reduced, the flow rate of the exhaust is reduced. Therefore, as the exhaust throttle 137 moves from the open position to the closed position, the flow rate of exhaust entering the aftertreatment system 159 decreases. Similarly, as the exhaust throttle 137 moves from the closed position to the open position, the flow rate of exhaust entering the aftertreatment system 159 increases.

The valve positions of the VGT device 119 and exhaust throttle 137 affect the load on the engine and thus the temperature of the exhaust gas. For example, when the VGT device 119 is in a closed position, a backpressure is created in the exhaust manifold. In order to overcome the backpressure in the exhaust, the engine must increase its pumping work. The increased pumping work results in an increase in the engine output exhaust gas temperature. Similar to the VGT device 119, the more closed the exhaust throttle 137 valve position, the more backpressure created in the exhaust manifold, and the more pumping work performed by the engine. Accordingly, in certain instances, the temperature of the engine output exhaust can be increased by closing at least one of the VGT device 119 and exhaust throttle 137. For example, in some implementations, the VGT device 119 and exhaust throttle 137 can be controlled independent of each other to increase the engine output exhaust gas temperature. Alternatively, the VGT device 119 and exhaust throttle 137 can be dependently or cooperatively controlled to provide more precise control of the engine output exhaust temperature.

The exhaust aftertreatment system 159 includes a catalytic component 140, a particulate filter 150 downstream of the catalytic component 140, and a regeneration mechanism. The exhaust gas may pass through one or more catalytic components, such as catalytic component 140, to reduce the number of pollutants in the exhaust gas prior to the gas entering the particulate filter. In certain implementations, the catalytic component 140 is a conventional diesel oxidation catalyst. The pollutants, e.g., carbon monoxide, particulate matter, and hydrocarbons, are reduced in an oxidation process within the catalytic component 140. Typically, for oxidation of the pollutants to occur, the catalyst of the catalytic component 140 much be at a temperature within a predetermined range, e.g., between about 250° C. and about 300° C. in some instances. The temperature of the catalytic component 140 is regulated by controlling the engine output exhaust temperature. The exothermic oxidation process for reducing the pollutants in the exhaust also causes the temperature of the exhaust to increase such that during an oxidation event on the catalytic component 140, the catalytic component outlet temperature is greater than the catalytic component inlet temperature. In some implementations, fuel is added to the exhaust prior to entering the catalytic component 140. In certain instances, the fuel is added via internal injections (e.g., heat post-injections and/or non-heat post-injections) and/or external injections. The added fuel raises the temperature of the exhaust exiting the catalytic component 140 by participating in the exothermic oxidation reaction. The amount of fuel added to the exhaust gas is proportional to the increase in the exhaust gas temperature due to the catalytic component 140, i.e., the catalytic component exhaust temperature increase.

The particulate filter 150 filters particulate matter from the exhaust gas stream before venting to the atmosphere. The particulate matter can build on the face of the particulate filter catalyst. Particulate matter produced by the engine 110 comprises ash and soot. Soot accumulates much faster than ash, such that, in many cases, particularly when the filter has been in operation for a relatively short period, an estimate of the rate of total particulate accumulation can be satisfactorily generated by estimating the rate of soot accumulation, treating the ash accumulation rate as negligible. Accordingly, the particulate filter 150 requires periodic regeneration to remove the particulate matter from the filter.

Various sensors, such as temperature sensors 124, pressure sensors 126, fuel sensor 128, exhaust gas flow sensor 165, and the like, may be strategically disposed throughout the engine system 100 and may be in communication with the controller 130 to monitor operating conditions. In one embodiment, the fuel sensor 128 senses the amount of fuel consumed by the engine, and the exhaust gas flow sensor 165 senses the rate at which exhaust gas is flowing at the particulate filter 150.

Engine operating conditions can be ascertained from any of the sensors or from the controller 130's commands to the engine regarding the fraction of exhaust gas recirculation, injection timing, and the like. In one embodiment, information is gathered regarding, for example, fueling rate, engine speed, engine load, the timing at which fuel injection timing is advanced or retarded (SOI, or start of injection), time passed, fraction of exhaust gas recirculation, driving conditions, whether and when regenerations have occurred and the rate such regenerations have removed particulate matter, exhaust flow rate, the amount of $O_2$ and $NO_2$ in the exhaust, filter temperature, exhaust gas pressure, filter particulate load amount and uniformity, etc.

The engine 110 will produce soot and ash at a rate that will vary according to the type of engine, which, in some implementations, is an 11-liter or 15-liter diesel engine. Additionally, the rate of particulate production will vary according to engine operating conditions such as fuel rate, EGR fraction, and SOI timing. Other factors may also bear on the particulate production rate, some depending heavily on the engine platform being considered, with others closer to being platform-independent.

Although the engine system 100 shown in FIG. 1 uses an internal fuel injection approach to controlling the exhaust gas temperature for regeneration events, in other embodiments, an external fuel injection approach can be used in conjunction with the non-additive fuel injection strategies described herein. The external fuel injection approach can be the same as or similar to the approach described in U.S. Pat. No. 7,263,825, which is incorporated herein by reference.

Figure 2:
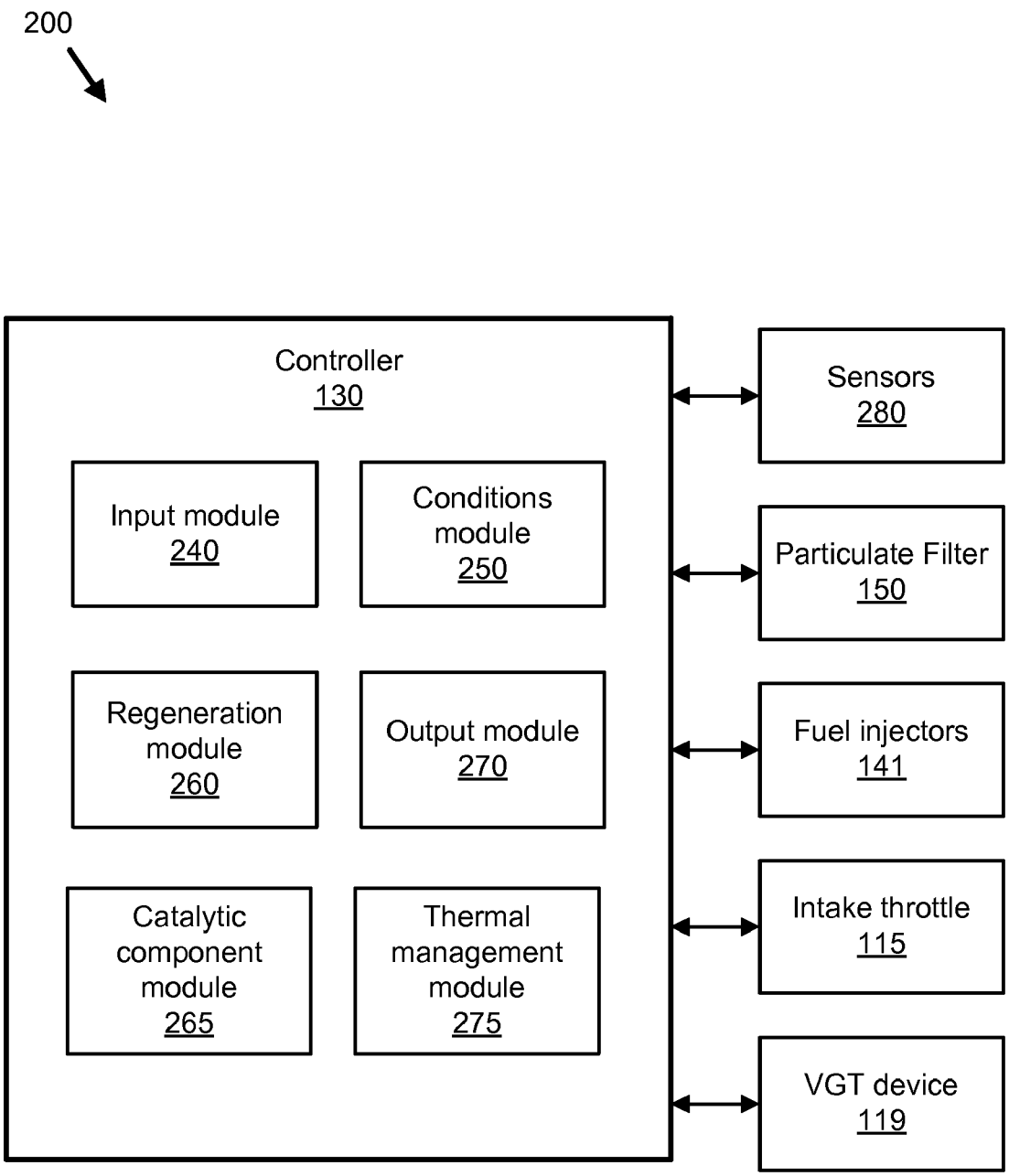
FIG. 2 is a schematic diagram of a controller of the engine system according to one embodiment.

FIG. 2 depicts a control system 200 according to one representative embodiment. The control system 200 comprises the controller 130, the intake throttle 115, the VGT device 119, the exhaust throttle 137, sensors 280 (e.g., sensors 124, 126, 128, 165), the particulate filter 150, and the fuel injectors 141. The controller 130 includes an input module 240, a conditions module 250, a regeneration module 260, a catalytic component module 265, an output module 270, and a thermal management module 275.

As is known in the art, the controller 130 and components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices. The controller 130 in FIG. 1 is depicted as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 100 to control the system to achieve desired results, and more specifically, achieve desired exhaust gas emissions at the tailpipe.

The sensors 280 are configured to determine a plurality of conditions within the engine system 100, including temperature, pressure, exhaust gas flow rate, etc. The particulate filter 150 is regenerated at the direction of the controller 130. The input module 240 is configured to input the conditions sensed by the sensors 280 and provide corresponding inputs to the regeneration module 260, which creates a regeneration vector according to the inputs. The conditions module 250 is configured to gather information regarding current operating conditions 430 of the engine system 100, based on the conditions sensed by the sensors 280 and/or other inputs including commands issued to system components by the controller 130. In certain implementations, the input module 240 inputs the temperatures of the exhaust at various locations along the engine exhaust stream. For example, the input module 240 inputs the sensed engine output exhaust temperature (e.g., the temperature of exhaust prior to the turbine 118), the sensed DOC 140 inlet exhaust temperature, the sensed particulate filter inlet exhaust temperature (e.g., the DOC outlet exhaust temperature), the sensed or modeled DOC catalyst temperature, and particulate filter 150 catalyst temperature.

The output module 270 is configured to direct the regeneration device 290 to regenerate the filter 150 according to regeneration instructions generated by the by the regeneration module 260 and the current conditions determined by the conditions module 250. The output module 270 also is configured to direct the fuel injectors 141 to inject fuel into the compression chambers of the engine 110 according to a fuel injection strategy determined by the thermal management module 275. Further, the output module 270 is configured to direct the intake throttle 115 to regulate the flow rate of intake air into the intake manifold 114 according to a desired intake air flow rate determined by the thermal management module 275. The output module 270 also is configured to command the VGT device 119 into a desired configuration determined by the thermal management module 275. Further, the output module 270 is configured to direct the exhaust throttle 137 to regulate the flow rate of exhaust entering the exhaust aftertreatment system 159 according to a desired aftertreatment system exhaust flow rate determined by the thermal management module 275.

Figure 3:
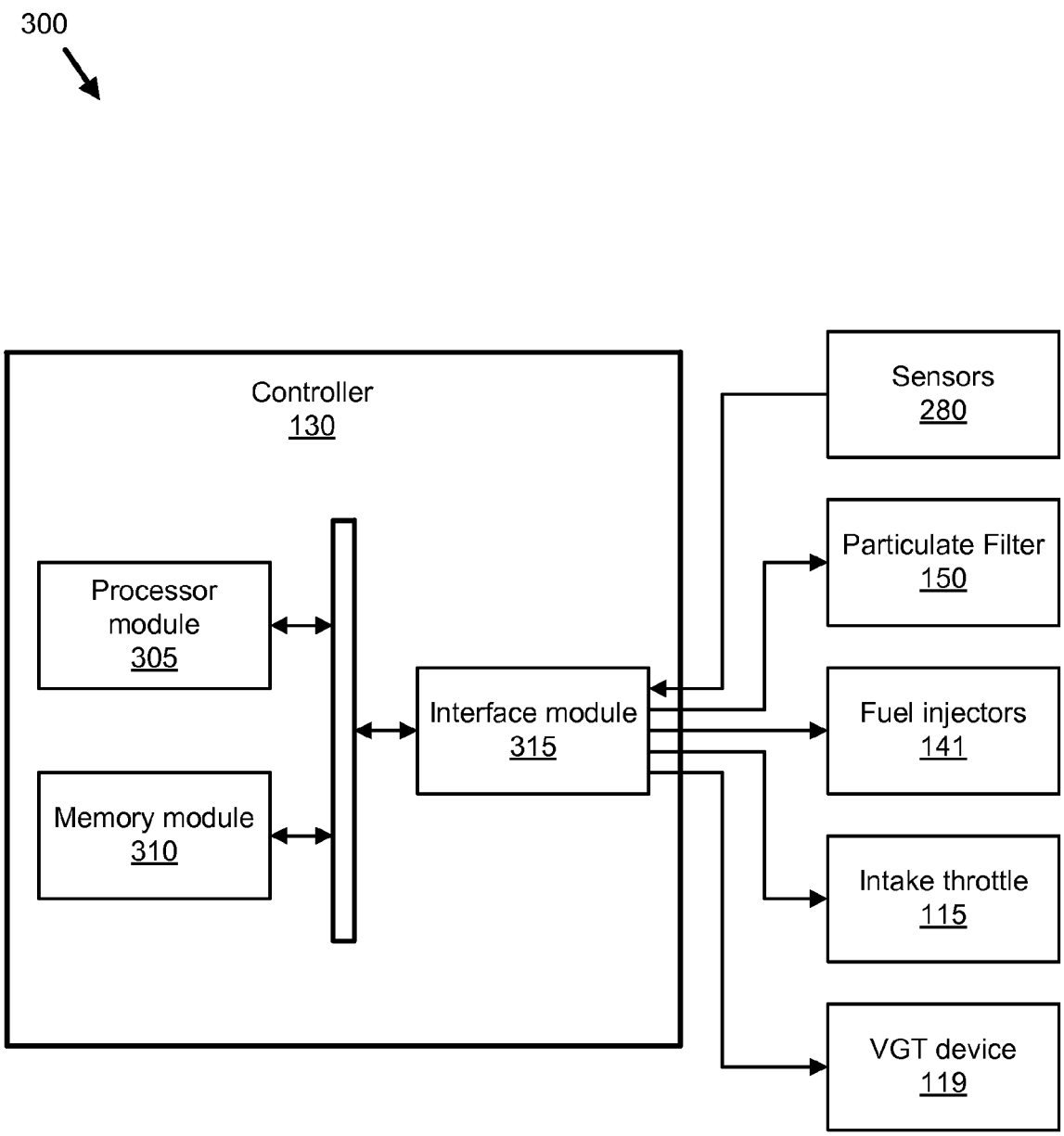
FIG. 3 is a schematic diagram of a controller of the engine system according to another embodiment.

FIG. 3 is a schematic block diagram illustrating another embodiment of a control system 300 that may embody control system 200 of FIG. 2. The controller 130 is depicted as comprising a processor module 305, memory module 310, and interface module 315. The processor module 305, memory module 310, and interface module 315 may be fabricated of semiconductor gates on one or more semiconductor substrates. Each semiconductor substrate may be packaged in one or more semiconductor devices mounted on circuit cards. Connections between the processor module 305, the memory module 310, and the interface module 315 may be through semiconductor metal layers, substrate to substrate wiring, or circuit card traces or wires connecting the semiconductor devices.

The memory module 310 stores software instructions and data comprising one or more software processes. The processor module 305 executes the software processes as is known to those skilled in the art. In one embodiment, the processor module 305 executes one or more software processes carried out by the conditions module 250, regeneration module 260, and thermal management module 275 of FIG. 2.

The processor module 305 may communicate with external devices and sensors, such as the sensors 280, the regeneration device 290, the fuel injectors 141, the intake throttle 115, the VGT device 119, and the exhaust throttle 137, of FIG. 2 through the interface module 315. For example, the sensors 280 may comprise a pressure sensor 126 (FIG. 1), with the sensors 280 communicating an analog signal representing a pressure value to the interface module 315. The interface module 315 may periodically convert the analog signal to a digital value and communicate the digital value to the processor module 305.

The interface module 315 may also receive one or more digital signals through a dedicated digital interface, a serial digital bus communicating a plurality of digital values, or the like. For example, the sensors 280 may comprise the air-flow sensor 156 of FIG. 1 and communicate a digital air flow value to the interface module 315. The interface module 315 may periodically communicate the digital air flow value to the processor module 305. In one embodiment, the interface module 315 executes one or more communication processes carried out by the input module 240 and output module 270 of FIG. 2.

The processor module 305 may store digital values such as the pressure value and the air flow value in the memory module 310. In addition, the processor module 305 may employ the digital values in one or more calculations including calculations carried out by the conditions module 250 and regeneration module 260. The processor module 305 may also control one or more devices, such as the fuel injectors 141, intake throttle 115, VGT device 119, exhaust throttle 137, and particulate filter 150, through the interface module 315.

The regeneration module 260 is configured to generate a regeneration command, e.g., regeneration instructions, representing a request to initiate a regeneration event on the particulate filter 150 and the desired characteristics of the regeneration event. In other words, the regeneration module 260 commands the regeneration device when to perform a regeneration event, how long to perform the regeneration event, the rate of regeneration during the regeneration event, and determines the desired temperature of the exhaust entering the particulate filter (e.g., a desired filter inlet exhaust temperature 425) necessary to achieve the desired characteristics of the regeneration event. The filter inlet exhaust temperature is equal to the engine output exhaust temperature plus the exhaust temperature increase produced by the catalytic component 140. The desired filter inlet exhaust temperature then is equal to a desired engine output exhaust temperature plus a desired catalytic component exhaust temperature increase. Accordingly, the desired filter exhaust temperature 425 is achievable by controlling at least one of the engine output exhaust temperature and the catalytic component exhaust temperature increase.

Generally, the engine output exhaust temperature is approximately equal to the DOC inlet exhaust temperature. Accordingly, as used herein, the engine output exhaust temperature and DOC inlet exhaust temperature can be used interchangeably.

Generally, the regeneration command and associated regeneration event characteristics are dependent upon the accumulation and/or distribution of particulate matter on the filter 150. Additionally, the regeneration command and event characteristics are dependent upon any of various other parameters, such as, for example, the operating conditions of the engine, the availability of future regeneration opportunities, the driving trends of the engine, etc. In certain embodiments, the regeneration module 260 generates the regeneration command by utilizing the particulate filter regeneration principles and strategies described in U.S. patent application Ser. Nos. 11/301,808 (filed Dec. 13, 2005), 11/301,998 (filed Dec. 13, 2005), 11/301,701 (filed Dec. 13, 2005), 11/227,857 (filed Sep. 15, 2005), 11/227,403 (filed Sep. 15, 2005), 11/301,693 (filed Dec. 13, 2005), 11/227,828 (filed Sep. 15, 2005), 11/226,972 (filed Sep. 15, 2005), 11/227,060 (filed Sep. 15, 2005), and 12/039,614 (filed Feb. 28, 2008), and U.S. Pat. Nos. 7,231,291; 7,263,825; and 7,188,512. Each of the above-listed patents and patent applications are incorporated herein by reference.

Figure 4:
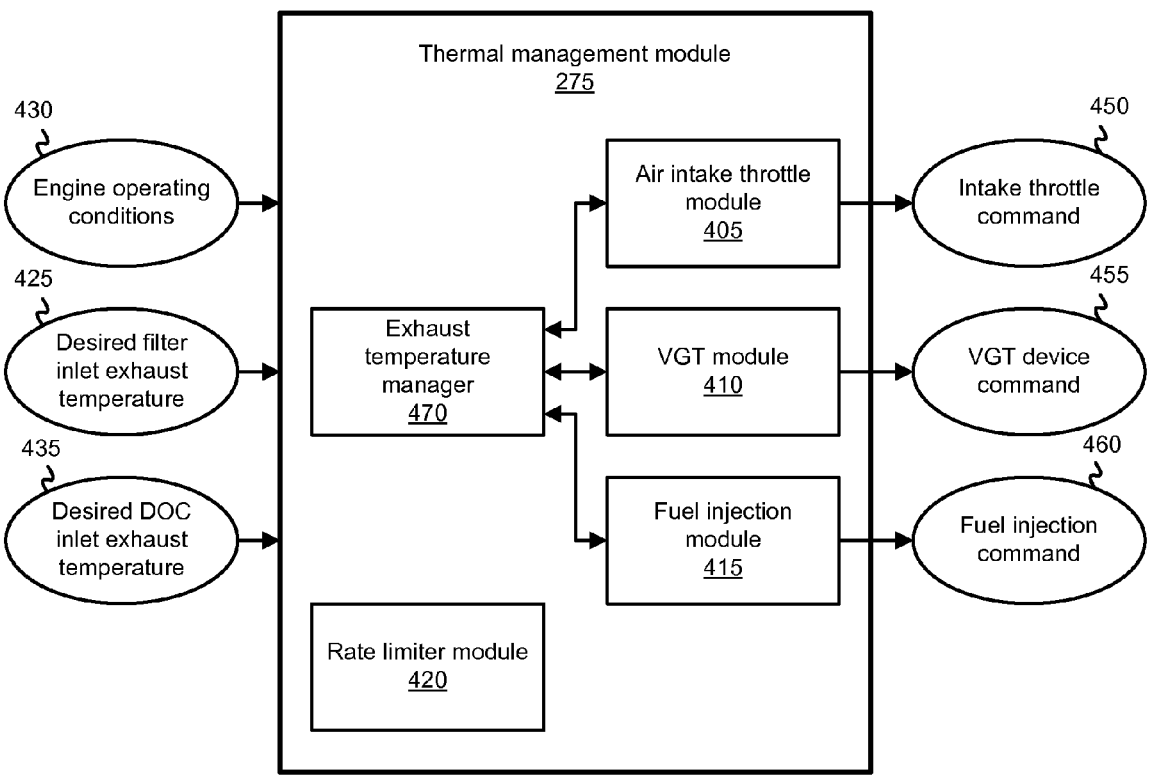
FIG. 4 is a schematic diagram of an thermal management module of the controller of FIG. 2.

The regeneration module 260 communicates the regeneration command, or at least certain portions of the regeneration command, to the thermal management module 275. In one embodiment, as shown in FIG. 4, the regeneration module 260 communicates the desired filter inlet exhaust temperature 425 of the regeneration command to the catalytic component module 265 and thermal management module 275.

The catalytic component module 265 determines a desired DOC inlet temperature 435 based at least partially on the desired particulate filter inlet exhaust temperature 425 and a desired DOC activation temperature. In certain implementations, the desired DOC activation temperature is a predetermined temperature equal to a minimum DOC activation temperature for achieving oxidation on the DOC catalyst. However, in some implementations, the desired DOC activation temperature can be greater than the minimum DOC activation temperature in order to achieve a higher level of oxidation and a greater increase in the temperature of the exhaust. For example, the desired particulate filter inlet exhaust temperature may be high enough that a DOC operating at the minimum DOC activation temperature will not efficiently achieve the DOC outlet temperature necessary for meeting the desired particulate filter inlet exhaust temperature. Therefore, the catalytic component module 265 can set the desired DOC activation temperature higher than the minimum DOC activation temperature and continually update the desired DOC activation temperature to more efficiently achieve the required DOC outlet exhaust temperature.

Once a desired DOC activation temperature is determined, the catalytic component module 265 determines the desired DOC inlet temperature 435 (e.g., engine output exhaust temperature) necessary to achieve the desired DOC activation temperature. The catalytic component module 265 communicates the desired DOC inlet temperature 435 to the thermal management module 275.

The thermal management module 275 includes an air intake throttle module 405, a VGT module 410, and a fuel injection module 415. Generally, the thermal management module 275 determines a thermal management strategy for each cycle of the engine 110. Each thermal management strategy represents the operating parameters of one or more components of the engine system estimated to achieve a desired engine output or DOC input exhaust temperature.

The thermal management strategy is represented by one or more component commands generated by the thermal management module 275 and communicated to the respective components via the output module 270 or interface module 314. In the illustrated embodiment, the commands include an intake throttle command 450, a VGT device command 455, and a fuel injection command 460. Generally, the air intake throttle 115, VGT device 119, and fuel injectors 141 respond to the respective commands 450, 455, 460 such that the DOC input exhaust temperature is at least approximately equal to the desired DOC input exhaust temperature.

The intake throttle command 450 represents the desired position of the air intake throttle 115 valve. The air intake throttle responds to the intake throttle command 450 by actuating the valve into the requested position to allow air to flow into the intake manifold 114 at a desired volumetric flow rate. The position of the air intake throttle 115, and thus the volumetric flow rate of air entering the intake manifold 114, affects the temperature of the exhaust gas generated by the engine.

The VGT device command 455 represents a desired position of the VGT device 119. The VGT device command 455 can request the VGT device 119 to move into a closed, open position, or any of various positions between the closed and open positions. As discussed above, the position of the VGT device 119 affects the rotational speed of the turbine, the pressurization of intake air, and the amount of air entering the intake manifold 114.

The fuel injection command 460 represents a desired fuel post-injection strategy. The fuel injectors 141 respond to the fuel injection command 460 by injecting fuel into the compression chambers according to the fuel injection command. Generally, the fuel injection command 460 includes instructions for performing a multiple-injection event for each cycle of the engine. In certain instances, the multiple-injection event is represented by the relative timing and dosages of a plurality of fuel injections. The plurality of fuel injections includes a main fuel injection and can include one or more of pilot fuel injections, heat post-injections, and non-heat post-injections. As discussed above, whether a post-injection is a heat or non-heat type post-injection depends largely on the timing of the injection, which is defined according to the crank angle of the crankshaft when the injection is scheduled to occur as discussed in U.S. patent application Ser. Nos. 12/111,831 (filed Apr. 29, 2008) and 12/111,845 (filed Apr. 29, 2008), which are incorporated herein by reference.

Figure 5:
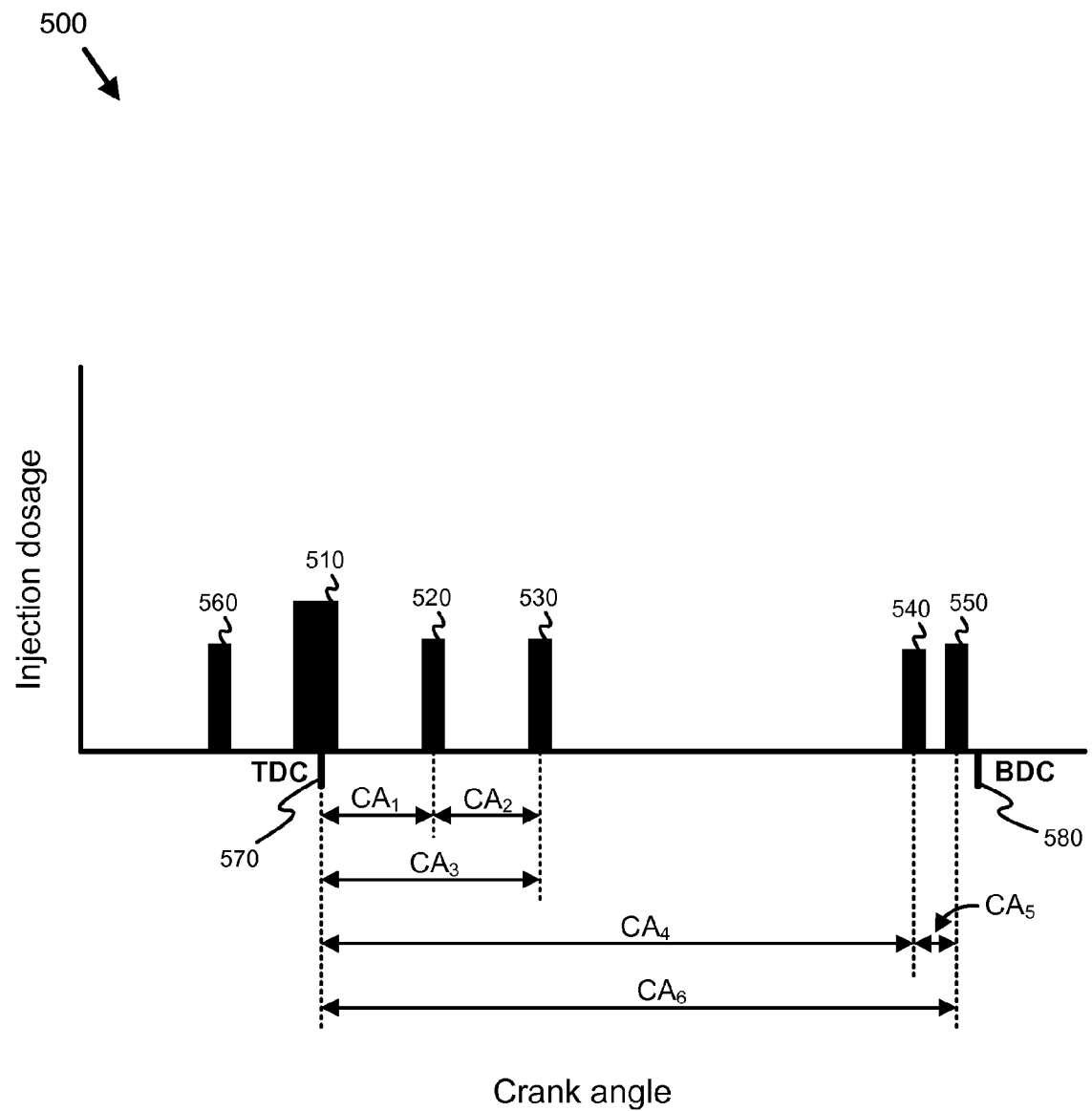
FIG. 5 is a chart showing a post-injection fuel injection strategy according to several embodiments.

Referring to FIG. 5, each regeneration fuel injection strategy, e.g., exemplary regeneration fuel injection strategy 500, includes fuel dosage and timing information for a main fuel injection 510 and at least a first heat post-injection 520. In some implementations, each regeneration strategy 500 can also include a second heat post-injection 530. The main fuel injection 510 is the primary injection of the combustion event in the cylinder. The main fuel injection 510 occurs whether a regeneration event is occurring or not. Each of the first and second heat post-injections 520, 530 also participate in the combustion event within the cylinder. More specifically, the first and second heat post-injections 520, 530 occur close enough to the main fuel injection 510 that they are involved in the combustion event driven by the main fuel injection. Because the heat post-injections participate in the combustion event, they largely affect the engine output exhaust temperature.

In some implementations, the exemplary regeneration fuel injection strategy 500 includes one or more non-heat post-injections. The illustrated regeneration fuel injection strategy includes two non-heat post-injections 540, 550. Because the non-heat post-injections 540, 550 occur well after the main fuel injection 510, they do not participate in the combustion event within the cylinder. Generally, the non-heat post-injections 540, 550 are included in the strategy 500 to enrich the exhaust with hydrocarbons. Although non-heat post injections can affect the engine output exhaust temperature, they primarily affect the DOC outlet exhaust temperature by affecting the oxidation event on the DOC 140.

The exemplary regeneration fuel injection strategy 500 also includes a pilot fuel injection 560 occurring just prior to the main fuel injection 510. The pilot fuel injection 560 drives a smaller combustion event preceding the main combustion event driven by the main fuel injection 510. The smaller combustion event promotes a gradual increase in the temperature within the compression cylinder prior to the rapid temperature increase associated with the main combustion event. Generally, the smaller combustion event reduces potential negative effects of the sudden temperature increase associated with main combustion events, e.g., engine knock and rattles.

An exemplary timing strategy of the fuel injections is shown in FIG. 5. The timing of the fuel injections are compared against a single combustion cycle timeline from a top-dead center (TDC) position 570 of the crank (i.e., when the piston reaches its uppermost point within the cylinder), to a bottom-dead center (BDC) position 580 of the crank (i.e., when the piston reaches its lowermost point within the cylinder), and back to the TDC position. The TDC position 570 is associated with a crank angle of zero-degrees and the BDC position 580 is associated with a crank angle of 180-degrees. As shown, the main fuel injection occurs at TDC, the first heat post-injection 520 occurs at a first crank angle $CA_1$ relative to the TDC position 570, and the second heat post-injection 530 occurs at a second crank angle $CA_2$ relative to the first crank angle $CA_1$ and a third crank angle $CA_3$ relative to the TDC position. The first non-heat post-injection 540 occurs at a fourth crank angle $CA_4$ relative to the TDC position 570 and the second non-heat post-injection 550 occurs at a fifth crank angle $CA_5$ relative to the fourth crank angle $CA_4$ and a sixth crank angle $CA_6$ relative to the TDC position.

The dosage of the fuel injections 510, 520, 530, 540, 550, 560 consists of the fuel flow rate and the fuel injection duration. In other words, the duel dosage can be varied by varying either one or more of the fuel flow rate and fuel injection duration.

Referring back to FIG. 4, the thermal management module 275 includes an exhaust temperature manager 470 in data receiving and transmitting communication with the air intake throttle module 405, VGT module 410, and fuel injection module 415. The intake throttle command 450, VGT device command 455, and fuel injection command 460 generated by the modules 405, 410, 415, respectively, are dependent upon each other. For example, under certain engine operating conditions, the VGT device command 455 and the commanded position of the VGT device 119 are dependent upon the intake throttle command 450 and commanded position of the intake throttle valve. Alternatively, under other operating conditions, the intake throttle command 450 is dependent upon the VGT device command 455. According to several implementations, the fuel injection command 460 and commanded regeneration fuel injection strategy is dependent upon both the intake throttle command 450 and the VGT device command 455.

The exhaust temperature manager 470 is configured to communicate data concerning the engine operating conditions 430, desired filter inlet exhaust temperature 425, and desired DOC inlet exhaust temperature 435 to each of the modules 405, 410, 415. Moreover, the exhaust temperature manager 470 receives information from and provides instructions to the modules 405, 410, 415 for assisting the modules' determination of the respective commands 450, 455, 460. Generally, the exhaust temperature manager 470 determines an engine controls strategy representing the relative configurations of the intake throttle valve 115, VGT device 119, and fuel injectors 141 for achieving the desired DOC inlet exhaust temperature 435.

The exhaust temperature manager 470 determines engine controls strategies for various operating conditions of the engine on a per cycle basis. Accordingly, the exhaust temperature manager 470 includes a controls system model or logic that modifies the engine controls strategy based at least partially on the operating conditions of the engine. More specifically, the exhaust temperature manager 470 is configured to modify the air intake throttle position, the VGT device position, and fuel post-injections to achieve an engine output exhaust temperature approximately equal to the desired DOC inlet exhaust temperature 435 at low operating speeds of the engine and low ambient temperatures.

Generally, the controls system logic regulates the mass charge flow rate and air intake flow rate in series to achieve desired engine output exhaust temperatures, e.g., DOC inlet exhaust temperatures. For example, the controls system logic can either modulate the mass charge flow rate and hold the air intake flow rate steady, or hold the mass charge flow rate and modulate the air intake flow rate.

In certain implementations, the controls system logic of the exhaust temperature manager 470 reduces the air-to-fuel ratio closer to a stoichiometric ratio such that thermal transport losses in the combustion process are reduced and the engine output exhaust temperatures are increased. In certain implementations, this is accomplished by manipulating, e.g., closing, the intake throttle valve position via the intake throttle command 450 to constrict the amount of air entering the intake manifold 114 (and thus the combustion cylinders). In conventional systems, the decrease in the air available for combustion by closing an intake throttle valve is compensated by a change in the geometry or position of, e.g., closing, the VGT device 119. As discussed above, closing the VGT device 119 results in an increase in the turbine speed and, consequently, an increase in the amount of air entering the compression cylinder. However, at low engine speeds, the additional air introduced in the compression cylinder also undesirably reduces the temperature of the engine output exhaust. Accordingly, contrary to conventional systems, in the controls system model described herein, instead of the VGT device 119 closing in response to a decrease in the air-to-fuel ratio, the VGT device remains unchanged or opens to keep the air-to-fuel ratio down and the engine output exhaust temperature up.

Figure 6:
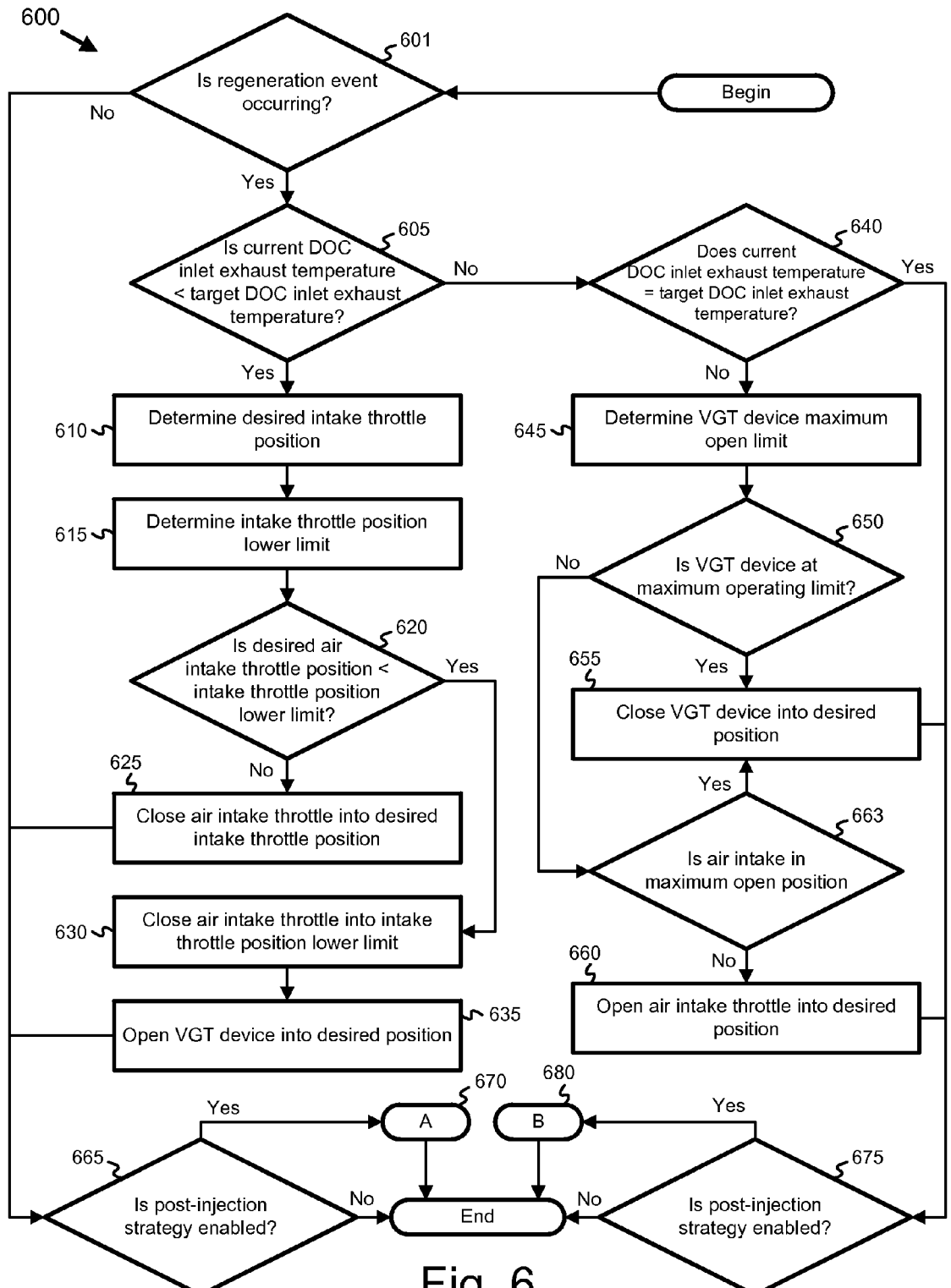
FIG. 6 is a schematic diagram of a method for controlling engine exhaust temperatures of an internal combustion engine during a regeneration event according to one embodiment.
Figure 7:
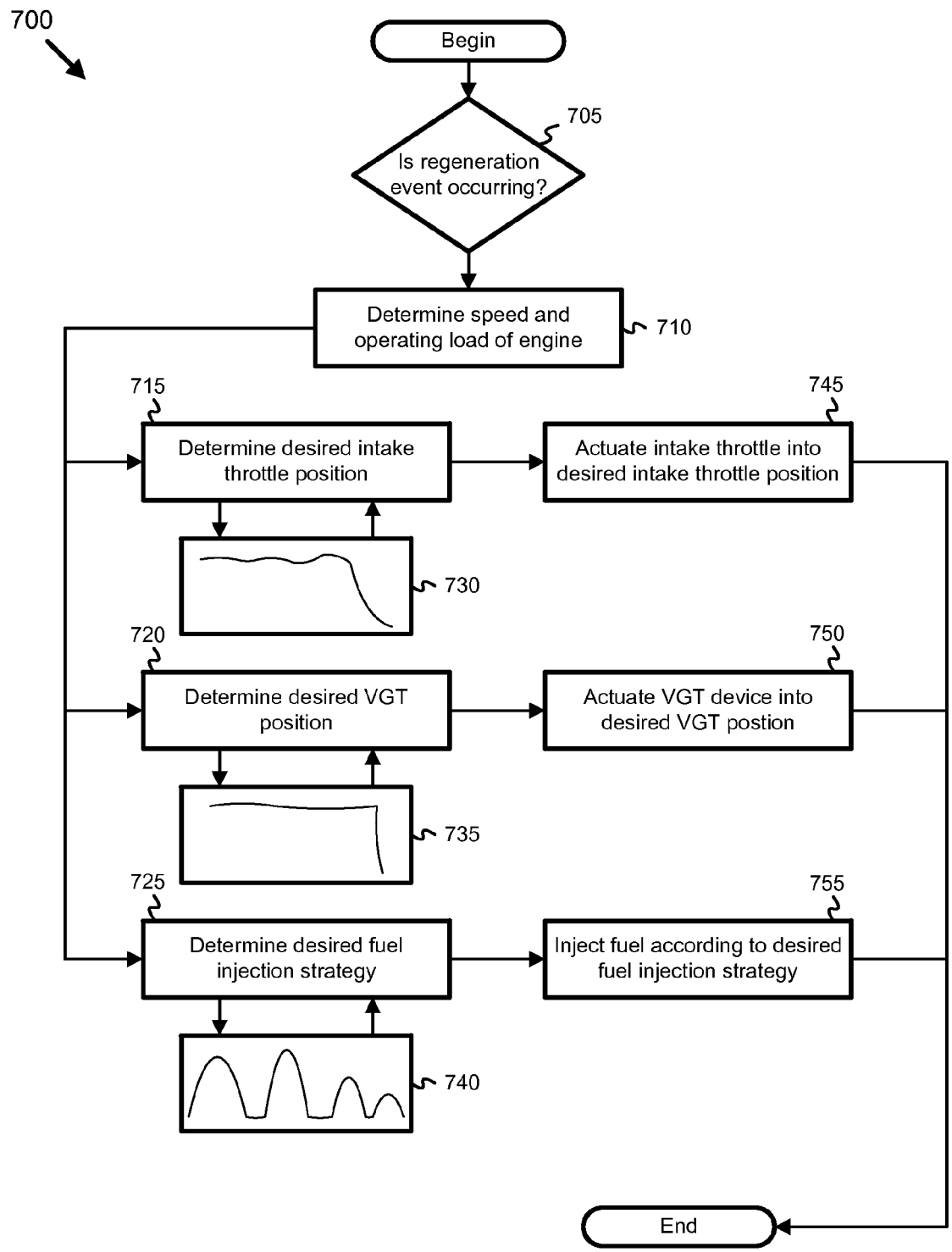
FIG. 7 is a schematic diagram of a method for controlling engine exhaust temperatures of an internal combustion engine during a regeneration event according to another embodiment.

According to one exemplary controls system logic 600 shown in FIG. 6, the thermal management module 275 first determines whether a regeneration event is occurring at 601. If a regeneration event is not occurring, the logic 600 ends. If a regeneration event is occurring, the logic determines 605 whether the current DOC inlet exhaust temperature, as interpreted from the engine operating conditions 430, is less than the target or desired DOC inlet exhaust temperature 435. If the current DOC inlet exhaust temperature is less than the target DOC inlet exhaust temperature, then the current DOC inlet exhaust temperature needs to be increased. A desired intake throttle position calculated to achieve the target DOC inlet exhaust temperature is determined at 610. The desired intake throttle position corresponds to the position of the throttle resulting in an air flow resulting in an air-to-fuel ratio necessary to achieve the target DOC inlet exhaust temperature 435. The desired intake throttle position can be obtained from a predetermined calibrated look-up table, such as a look-up table similar to table 730 of FIG. 7.

After the desired intake throttle position 610 is determined at 610, an intake throttle position lower limit is determined at 615. The intake throttle position lower limit corresponds to the position of the intake throttle 115 that restricts the flow of air into the compression cylinders such that an insufficient air-to-fuel ratio for combustion is in the compression cylinders. An insufficient air-to-fuel ratio results in, among other things, white smoke being emitted from the tailpipe. Generally, closing the air intake throttle position below the intake throttle lower limit does not result in any significant increases in the engine output exhaust temperature. The intake throttle position lower limit is a function of the speed and operating load of the engine 110. Accordingly, in some implementations, a look-up table containing predetermined intake throttle position lower limit values for various engine speeds and operating loads of the engine can be accessed by the thermal management module 275 in its determination of the intake throttle position lower limit. The intake throttle position lower limit value for engine speeds and operating loads falling outside of the various engine speeds can be determined through interpolation or extrapolation methods commonly used in the art.

The logic 600 determines 620 whether the desired air intake position is less than the intake throttle position lower limit. If the desired air intake position is not less than (i.e., greater than, equal to, or more open than) the intake throttle position lower limit, then the air intake throttle is actuated, e.g., closed, 625 into a position corresponding to the desired intake throttle position via the intake throttle command 450 while holding the VGT position steady. If, however, the desired air intake position is less than (i.e., more closed than) the intake throttle position lower limit, then the air intake throttle 115 is actuated (e.g., closed) 630 into a position corresponding to the intake throttle position lower limit while the VGT device position is held steady. Then, the VGT device 119 is opened 635 via the VGT device command 455 while the air intake throttle is held steady in the intake throttle position lower limit. The VGT device 119 is opened 635 into a desired position corresponding to a mass charge flow that results in an air-to-fuel ratio producing the target DOC inlet exhaust temperature. In certain instances, the desired VGT position is determined based on a desired reduction in the current mass charge flow as determined from a predetermined calibration table, such as a table similar to table 735 of FIG. 7.

In some implementations, if the current DOC inlet exhaust temperature is less than the target DOC inlet exhaust temperature, then the logic 600 can first open the VGT device 119 and then close the air intake throttle 115 if further exhaust gas temperature increase is needed. In such implementations, the relative positions of the VGT device 119 and intake throttle 115 is based on various operating parameters, such as, for example, engine displacement, current operating conditions, rates of change of the VGT device and intake throttle actuator positions, and timing and quantity of the fuel injection strategy.

The logic 600 also considers the event when the current DOC inlet exhaust temperature needs to be cooled down. For example, when current DOC inlet exhaust temperature is determined to be greater than the target DOC inlet exhaust temperature 435 at 605, the logic 600 determines 640 whether the current DOC inlet exhaust temperature is equal to the target DOC inlet exhaust temperature 435. If the current DOC inlet exhaust temperature equals the target DOC inlet exhaust temperature, then the logic 600 ends.

However, if the current DOC inlet exhaust temperature does not equal (e.g., is greater than) the target DOC inlet exhaust temperature, then the logic determines 645 a VGT maximum open limit. The VGT maximum open limit corresponds to the position of the VGT device 119 that restricts mass flow rate of air into the compression cylinders such that an insufficient air-to-fuel ratio for combustion is in the compression cylinders. Similar to the intake throttle position lower limit, the VGT maximum open limit is a function of the speed and operating load of the engine 110. Accordingly, in some implementations, a look-up table containing predetermined VGT maximum open limit positions for various engine speeds and operating loads of the engine can be accessed by the thermal management module 275 in its determination of the maximum open limit position. The maximum open limit position value for engine speeds and operating loads falling outside of the various engine speeds can be determined through interpolation or extrapolation methods commonly used in the art.

After determining the VGT maximum open limit, the logic 600 continues by determining 650 whether the current position of the VGT device 119 is at maximum open limit. If the current position of the VGT device 119 is at the maximum open limit, then the VGT device 119 is closed to increase the mass charge flow, increase the amount of air in the combustion cylinder, and decrease the engine output exhaust temperature. If the VGT device 119 is not at the maximum open limit, the logic 600 then proceeds to determine 663 whether the air intake throttle is positioned in a fully-opened position. If the air intake throttle is fully opened, then the logic 600 proceed to close 655 the VGT device 119 from its intermediate position, e.g., a position less than the VGT device maximum open limit, to increase the air-to-fuel ratio and decrease the engine output exhaust temperature. If the air intake throttle is not fully opened, then the logic 600 can proceed to open 660 the intake throttle into a predetermined desired position while holding the VGT device position steady to increase the flow rate of air entering the combustion cylinder, increase the air-to-fuel ratio, and decrease the engine output exhaust temperature. The predetermined desired position can be obtained from a predetermined look-up table.

As can be recognized from the foregoing, if event 640 is answered in the negative such the DOC inlet exhaust temperature needs to be cooled, the air intake throttle 115 and VGT device 119 are cooperatively modulated to maintain a desired mass charge flow corresponding to the desired DOC inlet exhaust temperature 435. Generally, the logic 600 provides that when the air intake throttle opens, which increases the mass charge flow rate, the VGT device 119 will also open to lower the mass charge flow rate. When the VGT device 119 opens sufficiently to reach the VGT maximum open limit, the logic 600 compensates by closing the VGT device 119 to increase the mass charge flow. Once the VGT device 119 closes into an intermediate position, i.e., the VGT device 119 is not at the maximum open limit 650, the logic 600 opens the air intake throttle 115 until the air intake throttle is fully open. If more cooling of the engine output exhaust temperature is required after the throttle is fully open, then the logic 600 then further closes 655 the VGT device into a predetermined desired position to increase the mass charge flow rate and decrease the engine output exhaust temperature while holding steady the intake throttle position. The predetermined desired position can be obtained from a predetermined look-up table.

In certain implementations, the logic 600 incorporates additional mechanisms for increasing or decreasing the temperature of the engine output exhaust. For example, referring again to FIG. 6, after events 625 or 635 are completed, the logic 600 can continue by determining 665 whether a post-injection strategy is enabled. Similarly, after events 655 or 663 are completed, the logic can continue by determining 675 whether a post-injection strategy is enabled. In some instances, a post-injection strategy is enabled if after events 625, 635, the current DOC inlet exhaust temperature is still less than the target DOC inlet exhaust temperature, or after events 655 or 663, the current DOC inlet exhaust temperature is still greater than the target DOC inlet exhaust temperature.

If a post-injection strategy is enabled, then the logic 600 proceeds to event 670 if the current DOC inlet exhaust temperature is less than the target DOC inlet exhaust temperature, or event 680 if the current DOC inlet exhaust temperature is more than the target DOC inlet exhaust temperature, which can include the implementation a regeneration post-injection strategy A or B, respectively. The post-injection strategies A, B can be any of various regeneration post-injection strategies, such as described in U.S. patent application Nos. U.S. patent application Ser. Nos. 12/111,831 and 12/111,845, which were incorporated by reference above. Generally, the regeneration post-injection strategies include combinations of heat and non-heat post-injections based at least partially on the speed and operating load of the engine. Moreover, because the injections involved in the combustion event typically have more impact on the temperature of the engine output exhaust, in several implementations, the regeneration post-injection strategies implemented at 670 are primarily concerned with the timing and dosage of heat post-injections. For example, in strategy A, retarding the timing and increasing the dosage of a heat-post injection results in a longer in-cylinder exothermic combustion process, and thus an increased engine output exhaust temperature. In contrast, speeding up the timing and decreasing the dosage of a heat-post injection results in a shorter in-cylinder exothermic combustion process, and thus a decreased engine output exhaust temperature. The number of post-injections and the timing and dosage of the post-injections of a particulate regeneration post-injection strategy is dependent upon the speed and operating load of the engine. Accordingly, in certain implementations, a look-up table containing predetermined post-injection data for various engine speeds and operating loads of the engine can be used to implement a post-injection strategy at event 670.

Although not necessary, the EGR valve is fully closed during implementation of logic 600 such that the air-to-fuel ratio and engine output exhaust temperature is not affected by EGR gas recirculating through the EGR system 115. In other implementations, the EGR valve can be controlled to regulate the air-to-fuel ratio and engine output exhaust temperature in conjunction with the air intake throttle 115, VGT device 119, and post-injection strategies.

The logic 600 can be defined as a closed loop type logic. For example, the logic 600 can be iteratively run to achieve a DOC inlet exhaust temperature equal to the target DOC inlet exhaust temperature. Alternatively, in certain instances, instead of ending after events 665, 670, 675, or 680, the logic 600 can proceed back to event 600. In such instances, the logic 600 does not end until event 640 is answered in the affirmative.

In some implementations, the thermal management module 275 uses an open loop type logic 700 for controlling the engine output exhaust temperature of the engine 110. For example, referring to FIG. 7, the logic 700 determines 705 whether a regeneration event is occurring. If a regeneration event is not occurring, then the logic 700 ends. If, however, a regeneration event is occurring, then the logic determines 710 the speed and operating load of the engine as interpreted from the engine operating conditions values 430. The logic 700 then proceeds to determine 715 a desired intake throttle position, determine 720 a desired VGT position, and determine 725 a desired fuel injection strategy.

The desired intake throttle position, VGT position, and desired fuel injection strategy are configured to cooperatively achieve the desired engine output temperature. As discussed above, the desired intake throttle position, VGT position, and desired fuel injection strategy correspond to a desired air intake flow rate, a desired mass charge flow rate, and a desired amount and timing of fuel post-injections, respectively, into the compression cylinder to produce a desired air-to-fuel ratio and engine output temperature. Each of the desired intake throttle position, VGT position, and desired fuel injection strategy is obtained from predetermined and precalibrated look-up tables comparing the desired positions/strategy against known operating speeds and loads of the engine. For example, for the current speed and operating load of the engine as determined at 710, the desired intake throttle position is obtained from look-up table 730, the desired VGT position is obtained from look-up table 735, and the desired fuel injection strategy is obtained from look-up table 740. The logic 700 then concludes by actuating 745 the air intake throttle 115 into the desired intake throttle position, actuating 750 the VGT device 119 into the desired VGT position, and injecting 755 fuel into the compression cylinders according to the desired fuel injection strategy.

The open loop strategy requires extensive calibration of the preferred intake throttle and VGR device positions, as well as post-injection strategies, for various operating loads and speeds. Accordingly, in certain situations, the logic 600 may not account for different engine configurations and uncontrollable and external conditions. To compensate for uncontrollable operating parameters, such as ambient and environmental conditions during operation of the engine 110, the logic 600 can be configured to achieve the maximum engine output exhaust temperatures that can be obtained for a given engine configuration. Generally, the maximum engine output temperature should be sufficient to meet the desired DOC inlet exhaust temperature regardless of the external conditions and different engine configurations that may be present.

When the logic 600, 700 is implemented during a regeneration event, the internal combustion engine 110 will experience a loss in power. Moreover, the engine may lose power if the amount of oxygen needed for fuel combustion drops below calibrated critical levels associated with the intake throttle position lower limit and VGT device maximum open limit. A driver would be aware of the power loss in his attempt to accelerate the engine by pressing an accelerator pedal. The loss of power, e.g. loss of drivability, is addressed in certain implementations of the logic 600, 700.

For example, the thermal management module 275 includes a rate limiter module 420 configured to compute a rate limiter shape factor when certain predefined engine conditions exist. The predefined engine conditions can include instances such as when the driver of the vehicle wishes to accelerate the vehicle at or above a predetermined rate, or when the vehicle is operating in cruise control and the cruise control system requests a predetermined increase in the commanded air/fuel ratio to maintain power. If the predefined engine conditions exist, the commanded outputs from the logic 600 are multiplied by the rate limiter shape factor to improve the drivability of the engine. The rate limiter module 420 can also be configured to modify the commanded outputs from the logic 600 to maintain the rate of change of one or more of the intake throttle 115 position, VGT device 119 position, and fuel injections below predetermined rates to ensure smooth transitions from one engine operating state to another. In other implementations, the rate limiter module 420 may determine whether the engine is being driven under urban or rural operating conditions and disable the implementation of the logic 600 accordingly. For example, if the engine is being operated under rural operating conditions, the engine output exhaust gas may be sufficient to achieve the DOC inlet exhaust temperature such that the implementation of logic 600, 700 is not necessary. Therefore, the rate limiter module 420 can request that the logic 600, 700 be disabled.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling the temperature of engine output exhaust of an internal combustion engine during a regeneration event on a particulate matter filter, comprising:
   a regeneration module configured to determine a desired diesel oxidation catalyst (DOC) inlet exhaust temperature during a regeneration event; and
   an exhaust temperature manager configured to determine an air-to-fuel ratio strategy for achieving a desired air-to-fuel ratio within a combustion chamber for producing an engine output exhaust temperature approximately equal to the desired DOC inlet exhaust temperature;
   wherein the air-to-fuel ratio strategy comprises a first mode and a second mode, the first mode comprising varying the position of an air intake throttle valve while maintaining a VGT device in a fixed position, and the second mode comprising varying the position of the VGT device while maintaining the air intake throttle valve in a fixed position; and wherein the first and second mode of the air-to-fuel ratio strategy each comprises manipulating the timing and dosage of a post-injection of fuel into the compression cylinder.

2. The apparatus of claim 1, further comprising a rate limiter module configured to modify the first and second modes according to the drivability of the engine.

3. The apparatus of claim 1, wherein:
the first mode is configured to vary an air intake flow rate and hold steady a mass charge flow rate; and
the second mode is configured to vary the mass charge flow rate and hold steady the air intake flow rate.

4. The apparatus of claim 1, wherein the first and second modes are configured to increase the engine output exhaust temperature to achieve the desired engine output exhaust temperature.

5. The apparatus of claim 1, wherein the first and second modes are configured to decrease the engine output exhaust temperature to achieve the desired engine output exhaust temperature.

6. The apparatus of claim 1, wherein the first mode transitions to the second mode when the position of the air intake throttle valve reaches an intake throttle position lower limit.

7. The apparatus of claim 1, wherein the second mode transitions to the first mode when the position of the VGT device reaches a maximum open limit.

8. A method for controlling the temperature of engine exhaust entering a diesel oxidation catalyst (DOC) upstream of a particulate matter filter, the method comprising:
determining a desired diesel oxidation catalyst (DOC) inlet exhaust temperature;
modifying the air-to-fuel ratio in compression cylinders of the engine according to at least one of a first and second strategy to achieve a desired engine output exhaust temperature approximately equal to the DOC inlet exhaust temperature, the first strategy comprising varying an air intake throttle position and holding steady a VGT device position, and the second strategy comprising varying the VGT device position and holding steady the air intake throttle position;
determining a desired intake throttle position for increasing the engine output exhaust and modifying the air-to-fuel ratio according to the first strategy by moving the intake throttle into the desired intake throttle position; and
after moving the intake throttle into the desired intake throttle position, modifying the air-to-fuel ratio according to the second strategy by opening the VGT device and maintaining the intake throttle in the desired intake throttle position.

9. The method of claim 8, wherein:
the desired intake throttle position comprises an intake throttle position for achieving the desired engine output exhaust;
if the desired intake throttle position is greater than an intake throttle position lower limit of the engine, closing the intake throttle into the desired intake throttle position; and
if the desired intake throttle position is less than the intake throttle position lower limit, setting the desired intake throttle position to the intake throttle position lower limit, and closing the intake throttle into the intake throttle position lower limit, and opening the VGT device while maintaining the intake throttle in the intake throttle position lower limit.

10. The method of claim 8, further comprising modifying the air-to-fuel ratio to decrease the engine output exhaust temperature according to the second strategy by closing the VGT device.

11. The method of claim 8, further comprising modifying the air-to-fuel ratio to decrease the engine output exhaust temperature according to the first strategy by opening the air intake throttle.

12. The method of claim 8, further comprising modifying the air-to-fuel ratio to decrease the engine out exhaust temperature, wherein:
if a current position of the VGT device is equal to a maximum open limit of the VGT device, closing the VGT device according to the second strategy; and
if the current position of the VGT device is less than the maximum open limit of the VGT device, opening the air intake throttle according to the first strategy.

13. The method of claim 8, wherein modifying the air-to-fuel ratio comprises modifying the air-to-fuel ratio in compression cylinders of the engine according to at least one of the first strategy, the second strategy, and a third strategy, the third strategy comprising a fuel post-injection strategy comprising at least one post-injection of fuel.

14. The method of claim 13, wherein the third strategy comprises at least one of retarding a timing of the at least one post-injection and increasing a dosage of the at least one post-injection event.

15. The method of claim 13, wherein the third strategy comprises at least one of retarding a timing of the at least one post-injection and decreasing a dosage of the at least one post-injection event.

16. An internal combustion engine system, comprising:
an internal combustion engine generating an engine output exhaust;
a fuel handling system for injecting fuel into the engine;
a particulate matter filter in exhaust receiving communication with the internal combustion engine;
a diesel oxidation catalyst (DOC) in exhaust receiving communication with the internal combustion engine and positioned between the internal combustion engine and the particulate matter filter; and
a controller comprising:
a processor module configured to determine a desired diesel DOC inlet exhaust temperature during a regeneration event and an air-to-fuel ratio strategy for achieving a desired air-to-fuel ratio in the engine for achieving a desired engine output exhaust temperature approximately equal to the desired DOC inlet exhaust temperature;
wherein the air-to-fuel ratio strategy comprises at least one of a first, second, and third strategy, the first strategy comprising varying the position of an air intake throttle valve while maintaining a VGT device in a fixed position, the second strategy comprising varying the position of the VGT device while maintaining the air intake throttle valve in a fixed position; and the third strategy comprising modifying the timing and dosage of at least one post-injection of fuel by the fuel handling system;
wherein when the current DOC inlet exhaust temperature is less than the desired DOC inlet exhaust temperature, the first strategy is implemented in an attempt to increase the current DOC inlet exhaust temperature to the desired DOC inlet exhaust temperature;

wherein if the first strategy fails to increase the current DOC inlet exhaust temperature to the desired DOC inlet exhaust temperature, the second strategy is implemented in an attempt to increase the current DOC inlet exhaust temperature to the desired DOC inlet exhaust temperature; and wherein if the first and second strategies fail to increase the current DOC inlet exhaust temperature to the desired DOC inlet exhaust temperature, the third strategy is implemented in an attempt to increase the current DOC inlet exhaust temperature to the desired DOC inlet exhaust temperature.

17. The system of claim 16, wherein:

when the current DOC inlet exhaust temperature is more than the desired DOC inlet exhaust temperature, the second strategy is implemented in an attempt to decrease the current DOC inlet exhaust temperature to the desired DOC inlet exhaust temperature;

if the second strategy fails to decrease the current DOC inlet exhaust temperature to the desired DOC inlet exhaust temperature, the first strategy is implemented in an attempt to decrease the current DOC inlet exhaust temperature to the desired DOC inlet exhaust temperature; and if the first and second strategies fail to decrease the current DOC inlet exhaust temperature to the desired DOC inlet exhaust temperature, the third strategy is implemented in an attempt to decrease the current DOC inlet exhaust temperature to the desired DOC inlet exhaust temperature.

18. The system of claim 16, wherein:

when the current DOC inlet exhaust temperature is more than the desired DOC inlet exhaust temperature, the first strategy is implemented in an attempt to decrease the current DOC inlet exhaust temperature to the desired DOC inlet exhaust temperature;

if the first strategy fails to decrease the current DOC inlet exhaust temperature to the desired DOC inlet exhaust temperature, the second strategy is implemented in an attempt to decrease the current DOC inlet exhaust temperature to the desired DOC inlet exhaust temperature; and if the first and second strategies fail to decrease the current DOC inlet exhaust temperature to the desired DOC inlet exhaust temperature, the third strategy is implemented in an attempt to decrease the current DOC inlet exhaust temperature to the desired DOC inlet exhaust temperature.

* * * * *